Figure 7:
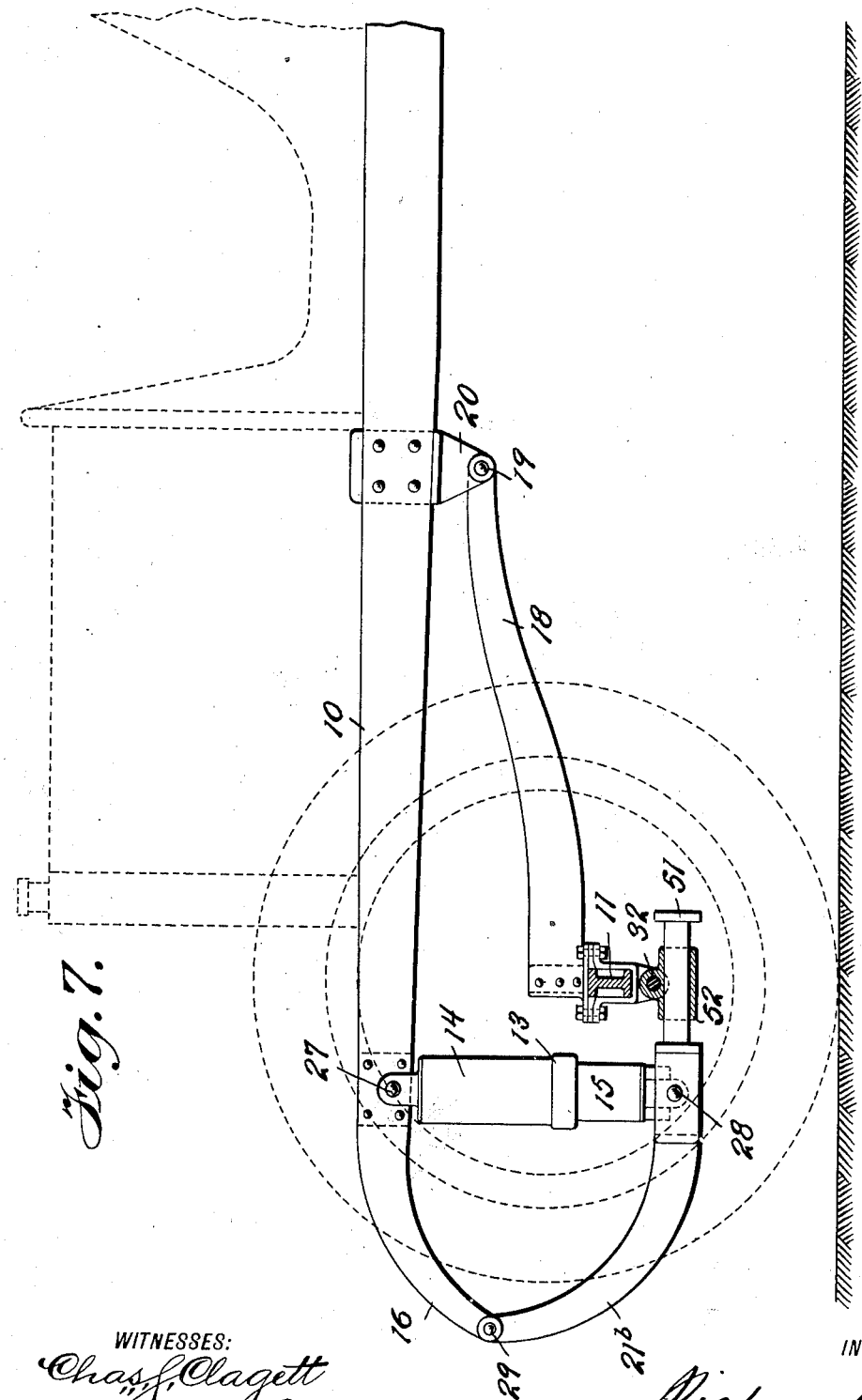

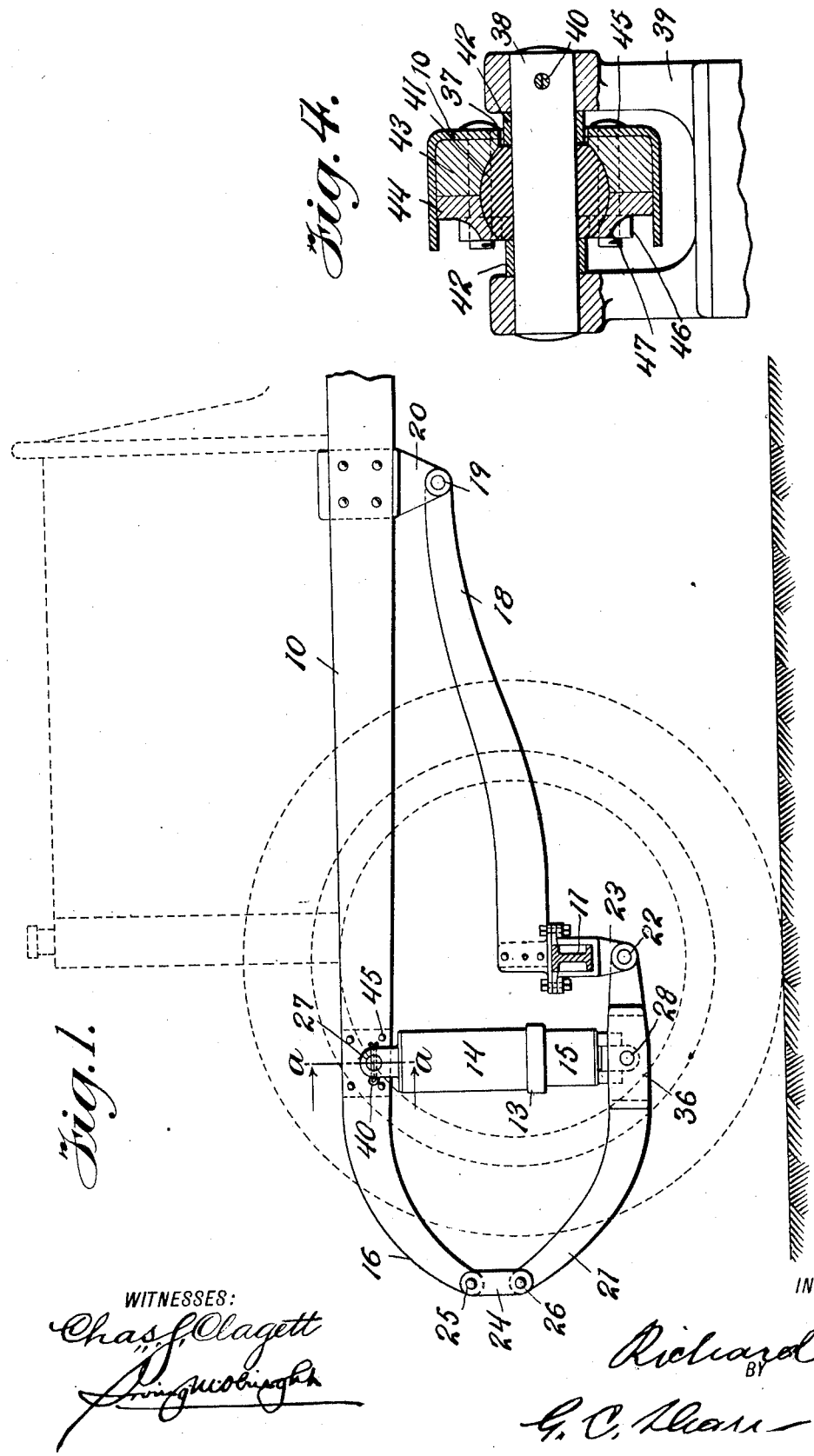

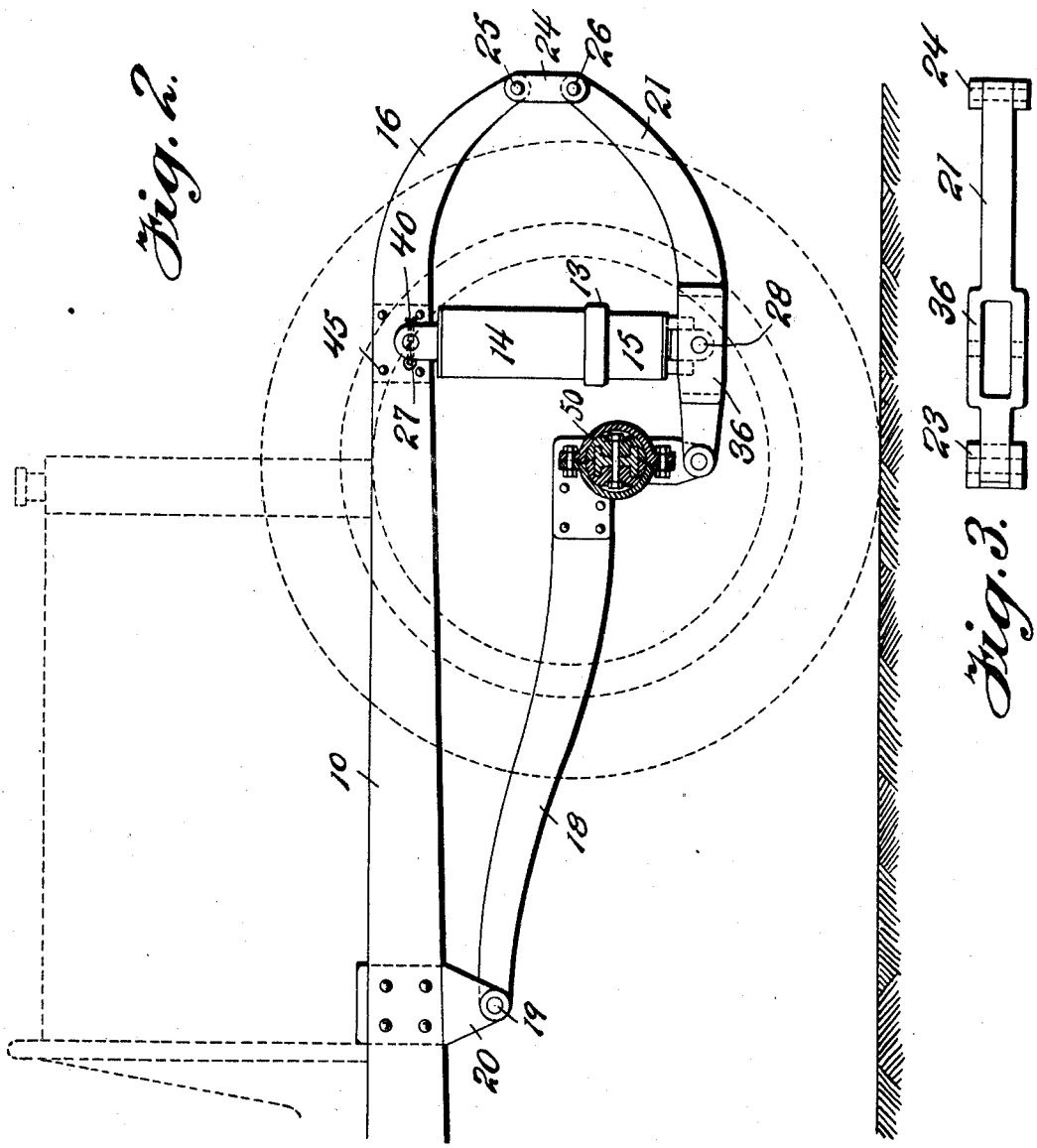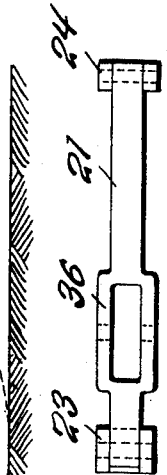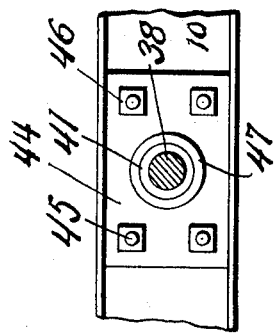

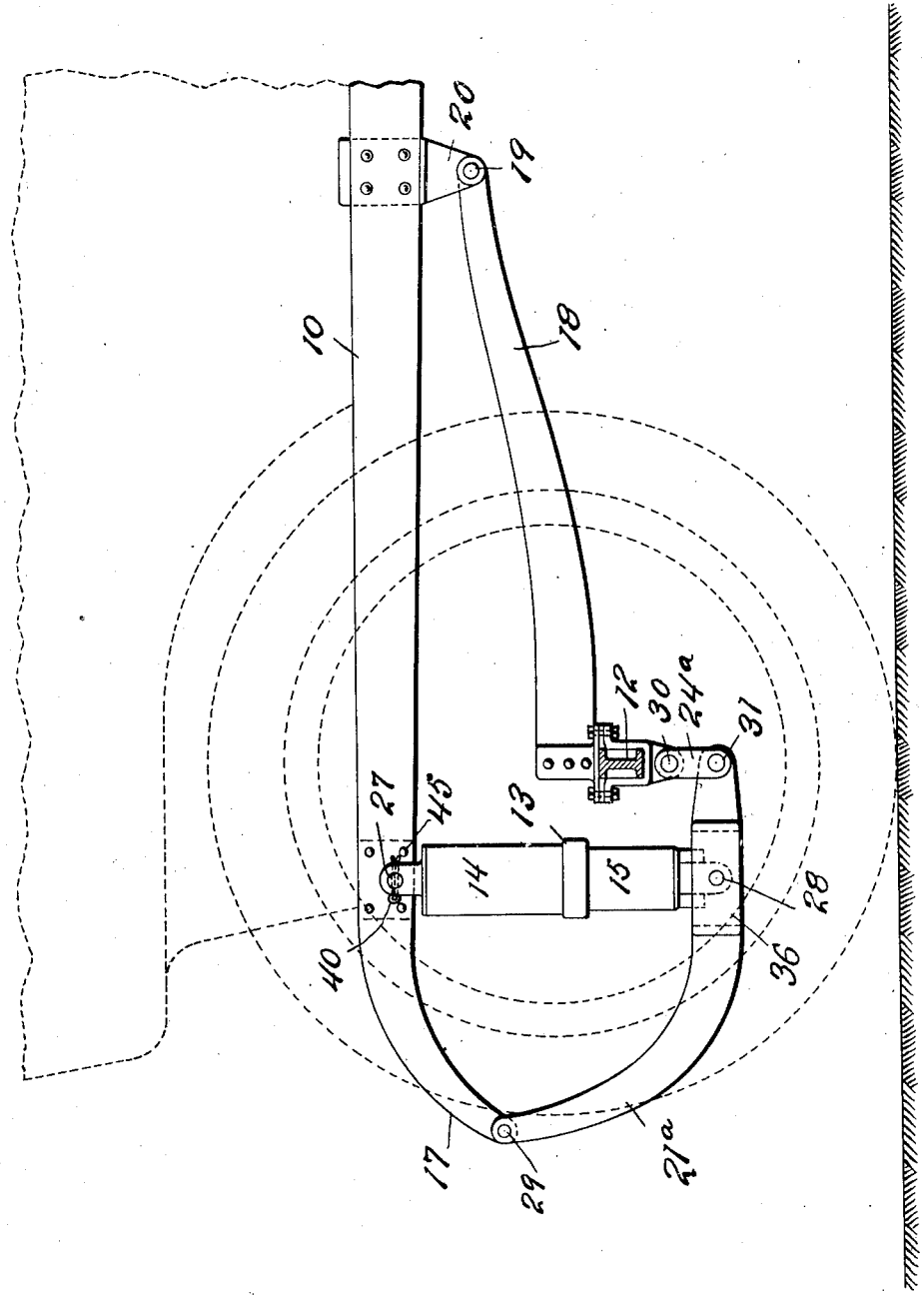

R. LIEBAU.
SPRING VEHICLE.
APPLICATION FILED JULY 27, 1910.

1,026,098.

Patented May 14, 1912.

5 SHEETS—SHEET 4.

WITNESSES:
Chas. F. Clagett

INVENTOR
Richard Liebau
BY
G. C. Dean ATTORNEY

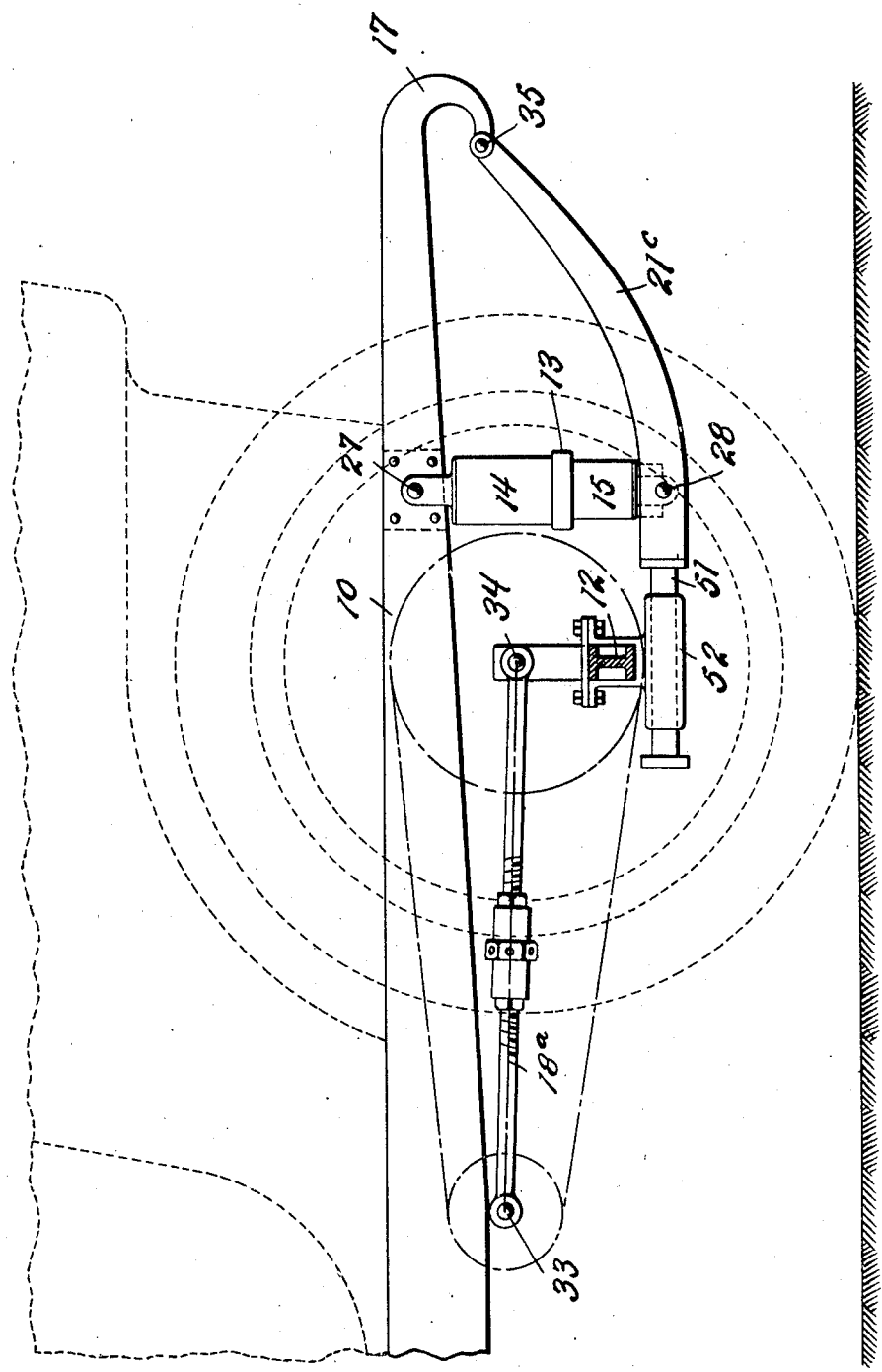

UNITED STATES PATENT OFFICE.

RICHARD LIEBAU, OF WATERVLIET, NEW YORK.

SPRING-VEHICLE.

1,026,098.      Specification of Letters Patent.      Patented May 14, 1912.

Application filed July 27, 1910. Serial No. 574,160.

*To all whom it may concern:*

Be it known that I, RICHARD LIEBAU, a citizen of the United States, and resident of Watervliet, in the county of Albany and State of New York, have invented certain new and useful Improvements Relating to Spring-Vehicles, of which the following is a specification.

My invention relates to vehicles comprising running gear, a body or load platform, interposed means for affording elastic support for the latter, and additional means maintaining operative running position of the running gear with respect to the body of the vehicle and the direction of movement, while permitting all of the relative vertical movements necessary for practical elastic cushion support of the body of the vehicle.

It relates more particularly to devices of the above class in which the elastic load supporting devices afford vertical support only and are not intended to withstand lateral thrust or strain.

The relative movements that are to be limited or prevented by the linkages are fore and aft and lateral movements of the axle and also fore and aft rocking thereof. The movements to be permitted are relative vertical movements of the axle, both where such relative vertical movement is equal for both ends of the axle, so that the latter maintains its normal parallelism with the plane of the load platform of the vehicle, and also where such relative vertical movement is greater, or different in direction, at one end of the axle, from the movement at the other end thereof, so as to produce an endwise tilt of the axle with respect to the car body frame. The linkages employed to prevent fore and aft displacements are usually arranged in pairs with their pivotal axes in alinement, one link being secured adjacent each end of an axle, and from such location it results that endwise tilt of the axle involves a differential angular relation of the links at the two ends of such axle, such differential angular relation tending to produce a longitudinal torsion or twist upon each link and also tending to produce differential circular movements of the links with respect to the axle as an axis.

It may be noted that the present invention is not concerned with means for preventing or limiting bodily lateral movements of the axle relative to the car body; and no means of this kind is shown in the accompanying drawings. But any of the cross-link or turn-table arrangements shown in my co-pending applications, for example, Serial Number 468,762, filed December 22, 1908, or Serial Number 540,806, filed January 29, 1910, or indeed any other suitable mechanisms having a like function, may be used in conjunction with the constructions herein shown and claimed.

The main general object of the present invention is to improve, correlatively and also with relation to the vehicle as a whole, the instrumentalities that perform the complementary functions of elastically supporting the weight of the car body on the wheels and of imparting forward travel from the wheels to the car body and vice-versa. The latter instrumentalities are the means for preventing fore and aft bodily movement of the axles relative to the body, and may or may not be fore and aft rock preventers.

The springs used in this invention for elastically supporting the weight of the load platform and the parts carried thereby on the wheels are preferably of the telescopic pneumatic cylinder type, such, for example, as shown in my co-pending application above-mentioned, Serial Number 468,762, filed December 22, 1908. As already stated, such devices discharge their functions to best effect when they act solely as compression members, and are subjected to no lateral stresses. In the application above referred to, the pneumatic springs are arranged at a considerable height, being supported at their upper ends by overhanging brackets that extend from the side members of the load platform. For many reasons it is very desirable to lower the springs, both with a view to bettering the performance of these devices and also to rendering them more harmonious elements of the complete design of the car. One very material consideration is that if the spring cylinders be lowered entirely below the load platform, they may be located in the vertical plane of the longitudinal axes of the side bars of the vehicle frame to which their upper ends are connected, thus eliminating the necessity for upward projecting brackets and rendering unnecessary any material modification of these side bars. An advantage of so disposing the springs that the points of application of the weight of the car body thereto is in the vertical plane of the side bars is the elimination of the torsional stresses on the side bars which are present when the spring cylinders are located at one side of the bars. The lower end of the spring is preferably secured to a special lever link that sustains none of the fore and aft driving stresses and resistances of the vehicle, such stresses being taken care of by radius bars or links either of usual or special construction. The special lever link is suspended below the axle, and connected at opposite ends with the load platform and the running gear in such manner as to allow for the relative fore and aft component of link, radius bar and axle movements. The spring is interposed between the load platform and the link intermediate the ends of the link. By reason of the lever link being underslung beneath the axle, the entire spring is lowered and by positioning the spring intermediate the axle and the pivotal connection of the link to the load platform, the extent of compression of the spring for a given vertical throw or depression is proportionately reduced, whence the length of the spring may be reduced, thereby making possible a further lowering of the upper end of the spring.

In the preferred forms of the invention, the radius link and the lever link extend in opposite directions from the axle, and the lever link is pivoted directly or indirectly to one of the usual forward or rear horns of the car frame. In this way difficulties as to interference between the spring and the radius link are completely and simply avoided, and other advantages accrue. In fact, this relative arrangement of the radius link and the spring compressing lever link is regarded as a broadly novel phase of this invention. Preferably, the axles are of the drop model, which tend to stability with respect to fore and aft rocking of the axle due to driving and road stresses, and this tendency to stability is further increased in the present case by having the load under-slung below the axle.

While it is advantageous for various reasons to have the lever link thus under-slung below the axle, it may not be advantageous to have the radius links so arranged and it is usually preferable to connect the radius links to the axles at or about the level of the centers of the wheels. In view of this consideration it is best to make the radius links and the spring-compressing lever links distinct; and a further consideration is that it is desirable to make the radius links laterally resilient so as to accommodate them to torsional stresses, whereas it is best to have the lever supports for the pneumatic cylinders rigid links. The utilization of spring-compressing lever links distinct from the linkage that transmits the running stresses from the wheels to the vehicle body and vice versa is regarded a broadly novel phase of the present invention.

The fore and aft rocking of the axle, hereinbefore referred to as one of the movements which it is desirable to prevent, may be taken care of either by the radius link or by the lever link.

A further object of the invention is to provide suitable means for securing the upper end of the spring to the side member of the load platform, and in such manner as to admit of universal angular movement.

The invention is illustrated in the accompanying drawings by certain of the possible embodiments thereof, and in the said drawings, Figure 1 is a side view, partially in dotted outline, of the forward part of an automobile, showing my invention applied with reference to the front axle; Fig. 2 is a similar view taken from the other side of the car; Fig. 3 is a bottom plan view of the lever link shown in Figs. 1 and 2; Fig. 4 is a section on the line a—a of Fig. 1; Fig. 5 is a detail inner side view of the parts shown in Fig. 4; Fig. 6 is a view similar in nature to Fig. 1, but showing the invention in a somewhat different embodiment and applied to the rear axle of a car; Fig. 7 is a similar view showing a different embodiment of the invention applied to the front axle; Fig. 8 is a similar view showing another embodiment of the invention applied to the rear axle.

In the several views, the numeral 10 indicates a side member of the load platform of the vehicle, 11 the front axle, 12 the rear axle, both axles being preferably of the drop variety, and 13 a pneumatic spring, comprising upper and lower telescopic cylinders 14 and 15.

16 and 17 are usual front and rear horns of the side members 10 of the car frame. These horns may be of usual or preferred form.

In Figs. 1 and 2, radius links 18, located adjacent the opposite ends of the front axle, are pivoted at their rear ends to the car body, as at 19, on depending brackets or castings 20 bolted to the side members 10, and the front end of one of the two links is secured rigidly to the axle, preferably at or about the level of the wheel axis. In order to provide for torsional twisting of these radius links due to endwise tilting of the axles, I prefer to make them in the nature of strong spring blades, rigid vertically but yieldable laterally, and to allow for the differential movement of the forward ends of the links about the axle as an axis also due to the endwise tilting, I prefer to connect the forward end of one of the links with the axle by means of cylindrical or spherical bearing and journal surfaces 50, as shown in Fig. 2, and all in accordance with the arrangements shown more particularly in my co-pending application filed January 29, 1910, Serial Number 540,809. The axle swings about the center 19, and rocking thereof is prevented by having the other radius link 18, secured thereto rigidly. The lever links 21, one adjacent each end of the axle, are swung below the dropped portion of the axle. In this form of the invention, the rear end of each lever link is pivoted to the axle, at 22, as by means of a bracket 23 depending from the axle. The link preferably has a substantially horizontal portion adjacent the axle, and then curves forward and upward. The upper end of the lever link is pivotally connected to the forward horn 16, by means of a short swinging link 24, which is pivoted at its upper end, at 25, to the horn and at its lower end, at 26, to the lever link. As a matter of fact, there are preferably two of these swinging links, at opposite sides of the horn and lever link, as shown in Fig. 3. The swinging link 24 allows of fore and aft movement of the lever link 21 relative to the car body, made necessary by the fact that the axle swings about the center 19. Preferably, the lever links 21 are rigid, both laterally and vertically, and the torsional effect on the lever links due to the endwise tilting of the axle is sufficiently taken up by the looseness or play at the three pivotal joints 22, 25 and 26. The upper cylinder 14 of the spring is connected to the side bar of the car body, as indicated at 27, and to the horizontal portion of the lever link 21, as indicated at 28. Preferably, both connections permit of universal angular movement.

Fig. 6 corresponds to the form of device shown in Figs. 1 and 2, with the exception that the lever link 21ᵃ is pivoted directly to the horn, at 29, while the swinging link 24ᵃ is interposed between the axle and the lever link, being pivotally connected thereto at 30 and 31, respectively.

In Fig. 7, the lever link 21ᵇ is pivoted directly to the horn, at 29, as in the case of the last form of the invention, and fore and aft movement of the lever link relative to the axle is permitted to a cylindrical portion 51 that slides in a cylindrical sleeve 52, pivoted at 32 to and beneath the axle. These coöperating sliding surfaces are made cylindrical to prevent torsional twisting of the preferably rigid lever link 21ᵇ.

It will be understood that in both forms of the invention shown in Figs. 6 and 7, the differential angular relation between the spring blade radius links 18 is provided for by connecting one of these links to the axle by means of cylindrical or spherical bearing and journal surfaces as shown in Fig. 2.

In Fig. 8 is shown the usual radius rod 18ᵃ, which is located adjacent each end of the rear axle in double chain drive vehicles. In the forms of the invention so far discussed, the radius link has been the rock-preventer, but here, since the radius rod is pivotally connected at both ends, at one end to the car body as shown at 33 and at the other end to the axle, at the level of the wheel center, as shown at 34, it follows that the function of rock-preventing must be delegated to the lever links 21ᶜ. These links are pivoted at their rear ends directly to the rear horns 17, as shown at 35, and at their forward ends are provided with cylindrical portions 51 sliding in cylindrical sleeves 52, as in the last form of the invention. But here only one of the sleeves 52 has the pivotal connection 32 with the axle shown in Fig. 7. The other sleeve 32 is rigid with the axle as shown in this Fig. 8, so that the corresponding lever link may act as a rock-preventer. The pivot 32 at the other side of the car (not shown) allows for the differential angular relation between the ends of the two lever links and the axle when endwise tilt of the axle occurs. The differential movements of the radius rods 18ᵃ about the axle at such times is provided for by the pivots 34. The torsional stress on the radius rods may be provided for as is customary in such devices by the usual turnbuckle connections between separate sections of the rod.

In all the forms of the invention the lower cylinder 14 of the spring is connected by the universal joint 28, which may consist of two pivots at right angles to each other, preferably to a recessed portion 36 of the lever link. These lever links are preferably either castings or drop forgings, and this recessed region may be formed by offsetting outward opposite portions of the sides of the link and providing the cavity therebetween.

The preferred form and arrangement of the upper universal joint 27 is shown more particularly in Figs. 4 and 5. An opening 37 is formed transversely through the side member 10 of the car frame, which is preferably in the nature of a channel iron, to permit the passage of a transverse connection 38 to the bifurcated bracket 39 formed on top of the upper cylinder 14 of the spring. Such connection is preferably, though not necessarily, in the form of a bolt or pin, which is preferably locked to the bracket 39 by means of a split pin 40. The universal joint is of the ball and socket variety, and the ball 41 may be fixed on the bolt 38, or slidable or rotatable thereon, or both slidable and rotatable. It may be separated from the bearing projections of the bracket 39 by means of spacing sleeves 42, if desired. The socket is formed in filling pieces 43 and 44 inserted in the channel of the iron 10. These pieces are transversely apertured in registry with the opening 37. The filling piece 43 is first inserted, in the assembling of the joint, the ball placed thereagainst, and the locking or face piece 44 is then placed over the piece 43 and the ball. The parts are then secured together by bolts 45 that pass through the pieces 43 and 44 and the vertical wall of the channel iron 10, the heads of the bolts being preferably located outside this vertical wall and the nuts 46 being preferably at the inner side of the face plate 44, on the inside of the frame where they are more concealed and better protected. The face piece 44 preferably has its socket portion formed in an annular boss 47, the remainder of the face of this piece being plain, so that adequate seats for the nuts are afforded. It will, thus, be seen that the springs are connected to the side members of the load platform in the horizontal plane thereof. Moreover, the point of application of the load to the spring is in the vertical plane of the frame member as well, whence it follows that there is practically no tendency toward sidewise tilt on the part of the springs. In other words, the springs are located substantially in the vertical plane of the side members of the car frame, and this without the necessity of modifying the side members other than by forming the openings 37 therein and securing the filling pieces 43 and 44 in the channels.

While I have herein shown and described, and have pointed out in the appended claims certain novel features of construction, arrangement, and operation which characterize my invention, it will be understood by those skilled in the art that various omissions, substitutions, and changes in the forms, proportions, sizes and details of the device and of its operation may be made without departing from my invention.

I claim:

1. In a vehicle, the combination with a body and running gear, and running-stress-transmitting linkage interposed between the two and comprising radius links, of lever links distinct from said linkage, being connected to the body and the running gear, one of said connections of each lever link being adapted to permit of the relative fore and aft component of link movement, and body-supporting pneumatic cylinders mounted at their lower ends on said lever links.

2. In a vehicle, the combination with a body and running gear, and running-stress-transmitting linkage interposed between the two and comprising radius links, of lever links distinct from said linkage, being connected adjacent their opposite ends to the body and the axles, one of said connections of each lever link being adapted to permit of the relative fore and aft component of link movement, and body-supporting pneumatic cylinders pivotally connected at their lower ends to said lever links intermediate the connections of the latter with the body and the axle.

3. In a vehicle, the combination with a body and running gear, and running-stress-transmitting linkage interposed between the two, of interposed lever links distinct from said linkage and swung below the axles, and body-supporting springs connected to the lever links intermediate their connections with the body and running gear.

4. In a vehicle, the combination with a body and running gear including an axle, and radius links connecting the body and axle, of lever links distinct from said radius links and connected to the body and running gear in such manner as to permit of the relative fore and aft component of link movement, said lever links being swung below said axle, and body-supporting springs connected to the lever links intermediate their connections with the body and running gear.

5. In a vehicle, the combination with a body and an axle, of a pair of radius links connecting the body and axle adjacent the ends of the latter, a pair of lever links distinct from said radius links connected adjacent their opposite ends to the body and said axle, the connections with the axle being adjacent the ends thereof, said lever links being swung below said axle, and body-supporting springs connected to the lever links intermediate the connections of the latter with the body and axle.

6. In a vehicle, the combination with a body and running gear including an axle, of running-stress-transmitting linkage including radius links connecting the body and axle, lever links distinct from said linkage and extending at the opposite side of said axle from said radius links, said lever links being connected to said body and running gear in such manner as to permit of the relative fore and aft component of link movement and being swung below the axle, and body-supporting springs connected to the lever links intermediate their connections with the body and running gear.

7. In a vehicle, the combination with a body having side bars terminating in horns, and running gear including an axle, of running-stress-transmitting linkage including radius links connecting the body and axle and extending from the axle away from said horns, lever links distinct from said linkage and extending at the opposite side of said axle from said radius links, being pivotally connected at the outer ends with the ends of said horns and connected adjacent their inner ends to and below said axle, and body-supporting springs connected to the lever links intermediate their connections with the horns and axle.

8. In a vehicle, the combination with a body and running gear including an axle, of running-stress-transmitting linkage including a pair of radius links connecting the body and the axle adjacent the ends of the latter, a pair of lever links distinct from said linkage, located adjacent the ends of said axle and extending at the opposite side thereof from said radius links, said lever links being connected adjacent their opposite ends to the body and said axle in such manner as to permit of the relative fore and aft component of link movement, and pneumatic cylinder supports for supporting the body on the running gear mounted at their lower ends on the lever links intermediate the connections of the latter with the body and axle.

9. In a vehicle, the combination with a body frame having side bars terminating in horns, and running gear including an axle, of running-stress-transmitting linkage including radius links connecting the body frame and axle and extending from the axle away from said horns, lever links distinct from said linkage, being pivotally connected at their outer ends with the ends of said horns and connected adjacent their inner ends to the running gear, one of the connections of each of said lever links permitting of the relative fore and aft component of link movement, and body-supporting pneumatic cylinders having lower supports on said lever links intermediate the connections of the latter with the horns and running gear.

10. In a vehicle, the combination with a body having side bars terminating in horns, and running gear including an axle, of running-stress-transmitting linkage including radius links connecting the body and axle and extending from the axle away from said horns, lever links distinct from said linkage and extending at the opposite side of said axle from said radius links, being connected at the inner ends to the running gear below said axle and curved upward to pivotal connections with the ends of said horns, and body-supporting pneumatic cylinders having lower mountings on the lower portions of said lever links intermediate the connections of the latter with the running gear and with the body.

11. In a vehicle, the combination with a body and an axle, of running-stress-transmitting linkage including a pair of laterally resilient radius links connecting the body and axle adjacent the ends of the latter, a pair of rigid lever links distinct from said linkage connected adjacent their opposite ends to the body and running gear, said lever links being swung below said axle, and body-supporting pneumatic cylinders having lower connections with the lever links intermediate the connections of the latter with the body and running gear.

12. In a vehicle, the combination with a body and an axle, of running-stress-transmitting linkage including a pair of laterally resilient radius links connecting the body and axle adjacent the ends of the latter, one of said radius links being rigidly secured to the axle and the other being swiveled thereon, a pair of rigid lever links distinct from said linkage connected adjacent their opposite ends to the body and running gear, being swung below the axle, and body-supporting pneumatic cylinders having lower mountings on the lever links intermediate the connections of the latter with the body and the running gear.

13. In a vehicle, the combination with a load platform and running gear, and running-stress-transmitting linkage interposed between the two, of interposed lever links distinct from said linkage and swung below the axle, and pneumatic cylinder supports for the load platform, being connected at their lower ends to the lever links intermediate the connections of the latter with the body and running gear, and having pivotal connections at their upper ends with the sides of the load platform substantially in the horizontal plane thereof.

14. In a vehicle, the combination with a load platform and running gear, and running-stress-transmitting linkage interposed between the two, of interposed lever links distinct from said linkage and swung below the axle, and pneumatic cylinder supports for the load platform, said supports being connected at their lower ends to the lever links intermediate the connections of the latter with the body and running gear, the entirety of said cylinder supports being disposed below said load platform.

15. In a vehicle, the combination with a body and running gear including an axle, and running-stress-transmitting linkage interposed between the two, of interposed lever links distinct from said linkage and swung below said axle, each of said lever links being pivotally connected adjacent their opposite ends with the body and the running gear and being provided with means allowing relative fore and aft movement of one of its ends as said axle swings about the center determined by said running-stress-transmitting linkage, and body-supporting pneumatic springs connected to the lever links intermediate their connections with the body and the running gear.

16. In a vehicle, the combination with a body and running gear including an axle, and radius links connecting the body and axle, said radius links being pivoted to the body and one being rigidly connected to the axle, of lever links distinct from said radius links and swung below the axle, each of said lever links being pivotally connected adjacent opposite ends with the body and the running gear and being provided with means allowing relative fore and aft movement of one of its ends as said axle swings about the center determined by said radius links, and body-supporting pneumatic springs connected to the lever links intermediate the connections of the latter with the body and the running gear.

17. In a vehicle, the combination with a body and running gear, and running-stress-transmitting linkage interposed between the two, of interposed lever links distinct from said linkages and swung below the axles, said lever links having pivoted connections adjacent their opposite ends with the body and running gear, one of said pivotal connections of each lever link being indirect and including a swinging link, and body-supporting pneumatic cylinders connected to the lever links, intermediate their connections with the body and running gear.

Signed at East Pittsburgh in the county of Allegheny and State of Pennsylvania this 21st day of July A. D. 1910.

RICHARD LIEBAU.

Witnesses:
  C. W. McGhee,
  E. W. McCallister.